United States Patent
Takahashi et al.

(10) Patent No.: US 6,999,406 B2
(45) Date of Patent: Feb. 14, 2006

(54) RECEPTION SYNCHRONIZATION APPARATUS AND DEMODULATING APPARATUS USING THE SAME

(75) Inventors: Hiroaki Takahashi, Tokyo (JP); Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 965 days.

(21) Appl. No.: 10/010,681

(22) Filed: Dec. 5, 2001

(65) Prior Publication Data

US 2002/0105903 A1 Aug. 8, 2002

(30) Foreign Application Priority Data

Dec. 8, 2000 (JP) ............................ P2000-374607

(51) Int. Cl.
*H04J 11/00* (2006.01)
(52) U.S. Cl. ...................... 370/208; 370/206; 370/207; 370/517; 370/504
(58) Field of Classification Search ........ 370/203–211, 370/503–512, 517, 350, 343; 375/362–366
See application file for complete search history.

(56) References Cited

U.S. PATENT DOCUMENTS

| | | | | |
|---|---|---|---|---|
| 5,602,835 A * | 2/1997 | Seki et al. ................. 370/206 |
| 6,192,056 B1 * | 2/2001 | Tsuruoka .................... 370/504 |
| 6,373,861 B1 * | 4/2002 | Lee ............................ 370/503 |
| 6,549,589 B1 * | 4/2003 | Tsuruoka .................... 375/343 |
| 6,647,025 B1 * | 11/2003 | Sudo ........................ 370/503 |
| 6,658,063 B1 * | 12/2003 | Mizoguchi et al. ......... 375/260 |
| 6,714,511 B1 * | 3/2004 | Sudo et al. ................. 370/208 |
| 2002/0086690 A1 * | 7/2002 | Takahashi et al. .......... 455/502 |

\* cited by examiner

*Primary Examiner*—Seema S. Rao
*Assistant Examiner*—Puneet Bhandari
(74) *Attorney, Agent, or Firm*—Jay H. Maioli

(57) ABSTRACT

A reception synchronization apparatus capable of achieving precise synchronization of an OFDM signal including a frame guard added to the OFDM signal includes a multiplier for calculating the correlation between a received OFDM signal and an OFDM signal delayed by a delay circuit; a moving integration circuit for adding a signal from the multiplier over a guard period; n frame guard removing circuits, which respectively receive a signal from the moving integration circuit, remove the frame guard period from the received signal, and output a resultant signal; n interval integrators for cumulatively adding signals outputted from the frame guard removing circuits; and a detection circuit for detecting a maximum peak from the results from the n interval integrators and generating a detection signal indicating a synchronization timing position corresponding to the detected maximum peak position.

28 Claims, 12 Drawing Sheets

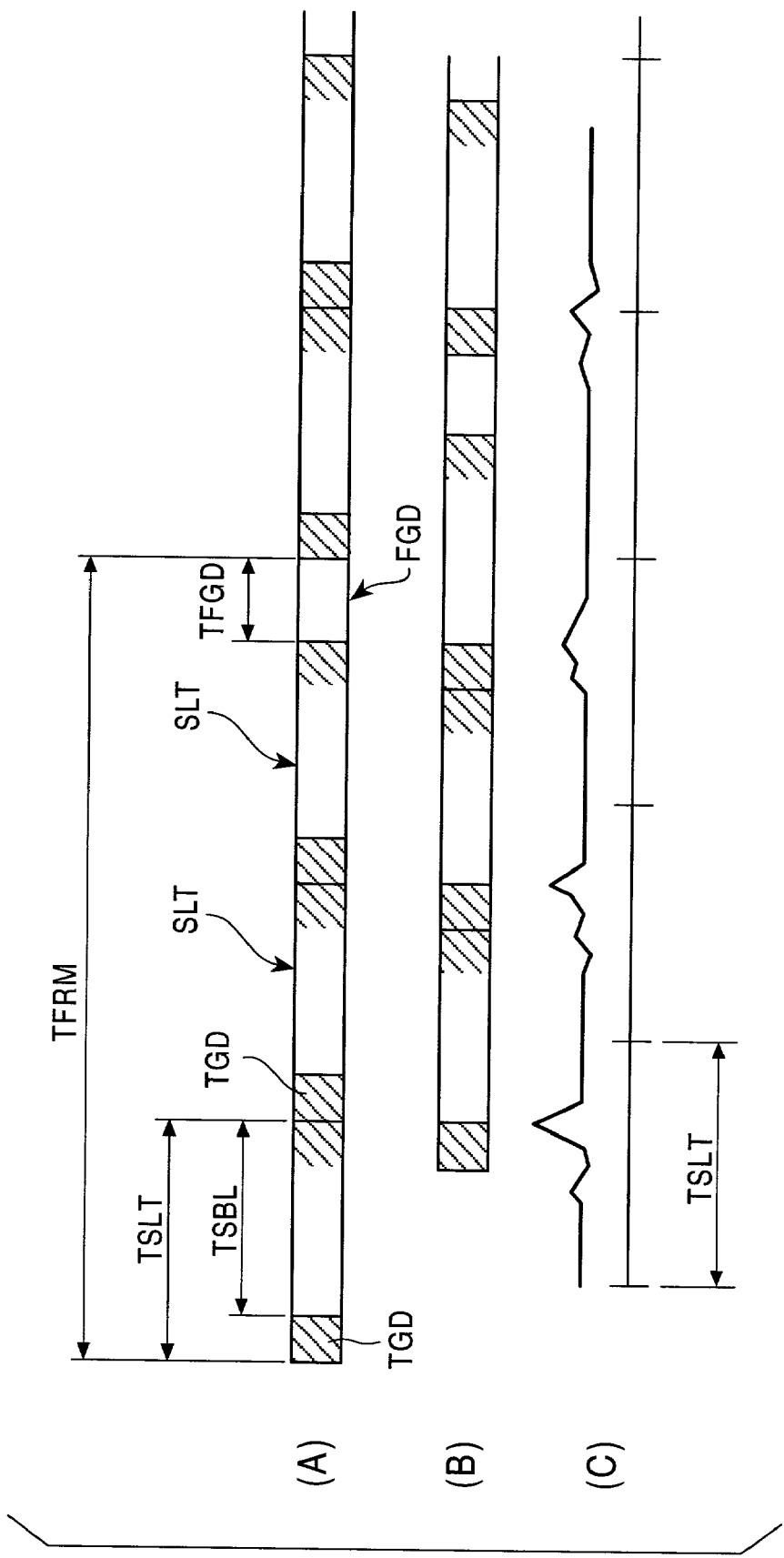

RECEPTION SYNCHRONIZATION APPARATUS AND DEMODULATING APPARATUS USING THE SAME

BACKGROUND OF THE INVENTION

1. Field of the Invention

The present invention relates to a reception synchronization apparatus for use in a mobile communication system or the like and to a modulating apparatus using such a reception synchronization apparatus. More particularly, the present invention relates to an improved reception synchronization circuit for receiving data modulated by means of an OFDM (Orthogonal Frequency Division Multiplexing) technique.

2. Description of the Related Art

In recent years, mobile communication using a portable telephone or the like has become increasingly popular. Mobile communication is used to transmit not only information with a small data size such as voice data but also information with a large data size.

In a mobile communication system, as shown in FIG. 9, a plurality of base stations BS are distributed in a ground plane so that a mobile station MS can communicate with a base station BS located near the mobile station MS.

Herein, an area within which a base station can communicate with a mobile station is referred to as a cell.

In such a mobile communication system, in order to avoid cross talk, each cell uses a frequency different from those used in adjacent cells.

However, the same frequency channel can be used in a more distant cell outside the adjacent cells without encountering a significant problem, because, for a mobile station MS being in a cell, the strength of a signal received from a base station BS of that cell is greater than that of an interfering signal coming from a distant cell.

If the distance among cells in which the same frequency channel is used is set to be very large, a large number of different frequency channels are necessary, and thus the spectrum efficiency becomes low. That is, there is a trade-off between the interference due to usage of same frequency channel and the spectrum efficiency.

Thus, it is important to design a communication system such that the system has high resistance against interference thereby achieving an improvement in the spectrum efficiency.

More specifically, in a communication system using the OFDM modulation technique, a plurality of time slots TSLT each including an effective symbol period TSBL and a guard period TGD are combined into a frame FRM, as shown in FIG. 10, and transmitted from a base station BS. In the example shown in FIG. 10, each frame FRM includes three time slots.

Base stations BS are synchronized in terms of transmission so that frames are transmitted with the same timing.

The purpose of a guard period TGD added to each effective symbol period TSBL is to suppress intersymbol interference due to multipath transmission or fading.

Each time slot including a guard period TGD is produced, as disclosed, for example, in Japanese Unexamined Patent Application Publication No. 7-99486, by connecting the same signal as a predetermined length of head or tail end part of a signal in an effective symbol period to an opposite end of that effective symbol period or by connecting the same signals as predetermined length of both head and tail end parts of a signal in an effective symbol period to opposite ends of the effective symbol period. More specifically, the same signal as a signal at a tail end part of an effective period is connected to the head end of the effective symbol period, or the same signal as a signal at a head end part of an effective period is connected to the tail end of the effective symbol period, or otherwise, the same signals as signals at head and tail end parts of an effective period are respectively connected to the tail and head ends of the effective symbol period.

In a receiving system of a mobile station that receives such an OFDM signal, as shown in FIG. 11, the correlation is determined between the received OFDM signal and a signal obtained by delaying the OFDM signal by a time equal to one effective symbol period. The start positions of respective effective symbol periods are then determined from peak positions of detected in the correlation. That is, it is possible to determine the location of a guard period in each time slot.

The detection of the start position of an effective symbol period allows an OFDM demodulator to perform an FFT (Fast Fourier Transform) operation.

An example of such an OFDM demodulator is disclosed in, for example, Japanese Unexamined Patent Application Publication No. 8-107431.

In the OFDM demodulator disclosed in the Japanese Unexamined Patent Application Publication No. 8-107431 cited above, the correlation between a received OFDM signal and a signal obtained by delaying the received OFDM signal by an effective symbol period, and the resultant correlation signal is subjected to an interval integration.

In the above process, the interval integration is performed, as shown in FIG. 12, for intervals created by dividing the correlation signal into segments that is, intervals, each having a length equal to the time slot period.

That is, the cumulative sum of the correlation signal is determined by repeatedly adding the correlation signal in the respective intervals. In the resultant signal, peaks appear at particular positions within the time slot period as shown in FIG. 12(E). In parts where there is no correlation, the values are averaged as the interval integration advances.

As described above, the interval integration makes it possible to clearly distinguish a correlated period from an uncorrelated period, and the detection of a peak makes it possible to achieve synchronization in a more reliable fashion.

In the communication system using an OFDM signal added with a guard period, as described above, although intersymbol interference due to multipath transmission or fading can be suppressed, there is still a possibility that a mobile station encounters interference when receiving the OFDM signal added with the guard period in some situations.

A mobile station receives a signal in such a manner as described below.

In addition to a desired wave DSW, a mobile station also receives an interfering wave IFW via the same channel. In most cases, the interfering wave IFW does not cause a problem, because the reception signal strength of the desired wave DSW is much greater than that of the interfering wave IFW.

However, fading occurs as a mobile station moves, and thus the reception signal strength of the desired wave DSW and that of the interfering wave IFW frequently vary.

In general, there is no correlation between fading of a desired wave DSW and that of an interfering wave IFW. That is, the desired wave DSW and the interfering wave IFW fluctuate independently of each other. This means that the reception signal strength of the interfering wave IFW can become high when that of the desired wave DSW becomes low. In such a case, there is a possibility that interference makes it impossible to receive the desired wave DSW.

In general, an interfering wave IFW arrives at a mobile station slightly later than a desired wave DSW, because the interfering wave IFW is transmitted from a base station at a more distant location while the desired wave DSW is transmitted from a base station at a closer location.

Referring to an example shown in FIG. 10, a possible reception of an interfering wave IFW is discussed below for a case in which a fluctuation in the reception signal strength due to fading causes a signal transmitted from a distant base station using the same channel to be received as an interfering wave IFW. It is assumed herein that only one frame is received as the interfering wave IFW as shown in FIG. 10(B).

In contrast, in the case of a desired wave DSW, frames are successively received as shown in FIG. 10(A).

Because the interfering wave IFW arrives slightly later than the desired wave DSW as shown in FIG. 10(B), the interfering wave IFW interferes with two frames, denoted by (i) and (ii) in FIG. 10, of the desired wave DSW.

One possible technique to improve the resistance of a communication system against interference caused by use of the same channel is to use a frame guard FGD as shown in FIG. 13.

In the example shown in FIG. 13, a frame FRM includes a frame guard period TFGD at the tail end thereof.

Unlike a guard period TGD disposed before or after an effective symbol period SBL, the frame guard period TFGD includes no signal.

Therefore, even if a frame guard disposed at the tail end of a frame of an interfering wave IFW overlaps with a head end part of a desired wave DSW, no interference occurs.

Thus, in the example shown in FIG. 13, although the interference causes the first frame, denoted by (iii) in FIG. 13, of the desired wave DSW to become impossible to be received, the second frame denoted by (iv) can be received without encountering interference.

However, in the convention OFDM demodulating apparatus described above, when the OFDM signal including frame guards is subjected to cumulative addition on a slot-by-slot basis in order to detect a synchronization position, the frame guards present in the middle make it impossible for a correlation peak to appear at a fixed position as shown in FIG. 14, and thus it is impossible to precisely detect the synchronization position.

In view of the above, it is an object of the present invention to provide a reception synchronization apparatus capable of achieving precise synchronization of an OFDM signal including an additional frame guard. It is another object of the present invention to provide a demodulating apparatus using such a reception synchronization apparatus.

SUMMARY OF THE INVENTION

According to an aspect of the present invention, to achieve the above objects, there is provided a reception synchronization apparatus for detecting a synchronization timing position thereby determining an effective symbol period, from an OFDM signal each frame of which includes a series of n (integer equal to or greater than 1) time slots and a frame guard period added to the series of n time slots, each time slot including an effective symbol period and a guard period added to the effective symbol period, the reception synchronization apparatus comprising: a delay circuit for delaying a received OFDM signal by an effective symbol period; a calculation circuit for calculating the correlation between the received OFDM signal and an OFDM signal delayed by the delay circuit; a frame guard removing circuit that receives a signal outputted from the calculation circuit, removes a frame guard period from a frame period of the received signal, and outputs a resultant signal; an interval integrator for cumulatively adding the signal outputted from the frame guard removing circuit, from one time slot period to another; and a detection circuit for detecting a maximum peak from the interval integration signal obtained for the intervals of time slot periods and generating a detection signal indicating a synchronization timing position corresponding to the detected maximum peak position, the detection signal being used to extract the effective symbol period with a precise timing corresponding to the maximum peak position.

According to another aspect of the present invention, there is provided a reception synchronization apparatus for detecting a synchronization timing position thereby determining an effective symbol period, from an OFDM signal each frame of which includes a series of n (integer equal to or greater than 1) time slots and a frame guard period added to the series of n time slots, each time slot including an effective symbol period and a guard period added to the effective symbol period, the reception synchronization apparatus comprising: a delay circuit for delaying a received OFDM signal by an effective symbol period; a calculation circuit for calculating the correlation between the received OFDM signal and an OFDM signal delayed by the delay circuit; a moving integration circuit for adding the signal outputted from the calculation signal over an entire guard period; a frame guard removing circuit that receives a signal outputted from the moving integration circuit, removes a frame guard period from a frame period of the received signal, and outputs a resultant signal; an interval integrator for cumulatively adding the signal outputted from the frame guard removing circuit, from one time slot period to another; and a detection circuit for detecting a maximum peak from the interval integration signal obtained for the intervals of time slot periods and generating a detection signal indicating a synchronization timing position corresponding to the detected maximum peak position, the detection signal being used to extract the effective symbol period with a precise timing corresponding to the maximum peak position.

According to still another aspect of the present invention, there is provided a reception synchronization apparatus for detecting a synchronization timing position thereby determining an effective symbol period, from an OFDM signal each frame of which includes a series of n (integer equal to or greater than 1) time slots and a frame guard period added to the series of n time slots, each time slot including an effective symbol period and a guard period added to the effective symbol period, the reception synchronization apparatus comprising: a delay circuit for delaying a received OFDM signal by an effective symbol period; a calculation circuit for calculating the correlation between the received OFDM signal and an OFDM signal delayed by the delay circuit; n frame guard removing circuits, disposed in correspondence with signals in respective first to nth time slot periods, which receive a signal outputted from the calculation circuit, remove the frame guard period from the received signal, and output a resultant signal; n interval integration circuits, disposed in correspondence with the respective n frame guard removing circuit, which cumulatively add the signals outputted from corresponding frame guard removing circuits from one time slot period to another; and a detection circuit for detecting a maximum peak from the interval integration signals supplied from the respective n interval integration circuits and generating a detection signal indicating a synchronization timing position corresponding to the detected maximum peak position, the detection signal being used to extract the effective symbol period with a precise timing corresponding to the maximum peak position.

According to still another aspect of the present invention, there is provided a reception synchronization apparatus for detecting a synchronization timing position thereby determining an effective symbol period, from an OFDM signal each frame of which includes a series of n (integer equal to or greater than 1) time slots and a frame guard period added to the series of n time slots, each time slot including an effective symbol period and a guard period added to the effective symbol period, the reception synchronization apparatus comprising: a delay circuit for delaying a received OFDM signal by an effective symbol period; a calculation circuit for calculating the correlation between the received OFDM signal and an OFDM signal delayed by the delay circuit; a moving integration circuit for adding the signal outputted from the calculation signal over an entire guard period; n frame guard removing circuits, disposed in correspondence with signals in respective first to nth time slot periods, which respectively receive a signal outputted from the moving integration circuit, remove the frame guard period from the received signal, and output a resultant signal; n interval integration circuits, disposed in correspondence with the respective n frame guard removing circuit, which cumulatively add the signals outputted from corresponding frame guard removing circuits from one time slot period to another; and a detection circuit for detecting a maximum peak from the interval integration signals supplied from the respective n interval integration circuits and generating a detection signal indicating a synchronization timing position corresponding to the detected maximum peak position, the detection signal being used to extract the effective symbol period with a precise timing corresponding to the maximum peak position.

The reception synchronization apparatus according to the present invention preferably further comprises an offset compensation signal generator for generating an offset compensation signal such that a supplied synchronization timing signal indicating the timing of extracting the effective symbol period is compared with the detection signal outputted from the detection circuit to measure a synchronization timing error, and the offset compensation signal is generated depending upon the measured synchronization timing error.

In the reception synchronization apparatus according to the present invention, preferably, the detection circuit detects a maximum peak by employing guard periods as synchronization points.

In the reception synchronization apparatus according to the present invention, preferably, the frame guard period is a non-signal period.

According to still another aspect of the present invention, there is provided a demodulating apparatus for extracting effective symbol periods from an OFDM signal in synchronization with a synchronization timing signal and demodulating signals in the extracted effective symbol periods, each frame of the OFDM signal including a series of n (integer equal to or greater than 1) time slots and a frame guard period added to the series of n time slots, each time slot including an effective symbol period and a guard period added to the effective symbol period, the demodulating apparatus including a reception synchronization apparatus comprising: a timing controller for generating the synchronization timing signal and correcting the synchronization timing on the basis of a supplied offset compensation signal; a delay circuit for delaying a received OFDM signal by an effective symbol period; a calculation circuit for calculating the correlation between the received OFDM signal and an OFDM signal delayed by the delay circuit; a frame guard removing circuit that receives a signal outputted from the calculation circuit, removes a frame guard period from a frame period of the received signal, and outputs a resultant signal; an interval integrator for cumulatively adding the signal outputted from the frame guard removing circuit, from one time slot period to another; a detection circuit for detecting a maximum peak from the interval integration signal obtained for the intervals of time slot periods and generating a detection signal indicating a synchronization timing position corresponding to the detected maximum peak position, the detection signal being used to extract the effective symbol period with a precise timing corresponding to the maximum peak position; and an offset compensation signal generator for generating the offset compensation signal to be supplied to the timing controller such that the synchronization timing signal is compared with the detection signal outputted from the detection circuit to measure a synchronization timing error and the measured result is supplied as the offset compensation signal to the timing controller.

According to still another aspect of the present invention, there is provided a demodulating apparatus for extracting effective symbol periods from an OFDM signal in synchronization with a synchronization timing signal and demodulating signals in the extracted effective symbol periods, each frame of the OFDM signal including a series of n (integer equal to or greater than 1) time slots and a frame guard period added to the series of n time slots, each time slot including an effective symbol period and a guard period added to the effective symbol period, the demodulating apparatus including a reception synchronization apparatus comprising: a timing controller for generating the synchronization timing signal and correcting the synchronization timing on the basis of a supplied offset compensation signal; a delay circuit for delaying a received OFDM signal by an effective symbol period; a calculation circuit for calculating the correlation between the received OFDM signal and an OFDM signal delayed by the delay circuit; a moving integration circuit for adding the signal outputted from the calculation signal over an entire guard period; a frame guard removing circuit that receives a signal outputted from the moving integration circuit, removes a frame guard period from a frame period of the received signal, and outputs a resultant signal; an interval integrator for cumulatively adding the signal outputted from the frame guard removing circuit, from one time slot period to another; a detection circuit for detecting a maximum peak from the interval integration signal obtained for the intervals of time slot periods and generating a detection signal indicating a synchronization timing position corresponding to the detected maximum peak position, the detection signal being used to extract the effective symbol period with a precise timing corresponding to the maximum peak position; and an offset compensation signal generator for generating the offset compensation signal to be supplied to the timing controller such that the synchronization timing signal is compared with the detection signal outputted from the detection circuit to measure a synchronization timing error and the measured result is supplied as the offset compensation signal to the timing controller.

According to still another aspect of the present invention, there is provided a demodulating apparatus for extracting effective symbol periods from an OFDM signal in synchronization with a synchronization timing signal and demodulating signals in the extracted effective symbol periods, each frame of the OFDM signal including a series of n (integer equal to or greater than 1) time slots and a frame guard period added to the series of n time slots, each time slot including an effective symbol period and a guard period added to the effective symbol period, the demodulating apparatus including a reception synchronization apparatus comprising: a timing controller for generating the synchronization timing signal and correcting the synchronization timing on the basis of a supplied offset compensation signal; a delay circuit for delaying a received OFDM signal by an effective symbol period; a calculation circuit for calculating the correlation between the received OFDM signal and an OFDM signal delayed by the delay circuit; n frame guard removing circuits, disposed in correspondence with signals in respective first to nth time slot periods, which receive a signal outputted from the calculation circuit, remove the frame guard period from the received signal, and output a resultant signal; n interval integration circuits, disposed in correspondence with the respective n frame guard removing circuit, which cumulatively add the signals outputted from corresponding frame guard removing circuits from one time slot period to another; a detection circuit for detecting a maximum peak from the interval integration signals supplied from the respective n interval integration circuits and generating a detection signal indicating a synchronization timing position corresponding to the detected maximum peak position, the detection signal being used to extract the effective symbol period with a precise timing corresponding to the maximum peak position; and an offset compensation signal generator for generating the offset compensation signal to be supplied to the timing controller such that the synchronization timing signal is compared with the detection signal outputted from the detection circuit to measure a synchronization timing error and the measured result is supplied as the offset compensation signal to the timing controller.

According to still another aspect of the present invention, there is provided a demodulating apparatus for extracting effective symbol periods from an OFDM signal in synchronization with a synchronization timing signal and demodulating signals in the extracted effective symbol periods, each frame of the OFDM signal including a series of n (integer equal to or greater than 1) time slots and a frame guard period added to the series of n time slots, each time slot including an effective symbol period and a guard period added to the effective symbol period, the demodulating apparatus including a reception synchronization apparatus comprising: a timing controller for generating the synchronization timing signal and correcting the synchronization timing on the basis of a supplied offset compensation signal; a delay circuit for delaying a received OFDM signal by an effective symbol period; a calculation circuit for calculating the correlation between the received OFDM signal and an OFDM signal delayed by the delay circuit; a moving integration circuit for adding the signal outputted from the calculation signal over an entire guard period; n frame guard removing circuits, disposed in correspondence with signals in respective first to nth time slot periods, which respectively receive a signal outputted from the moving integration circuit, remove the frame guard period from the received signal, and output a resultant signal; n interval integration circuits, disposed in correspondence with the respective n frame guard removing circuit, which cumulatively add the signals outputted from corresponding frame guard removing circuits from one time slot period to another; a detection circuit for detecting a maximum peak from the interval integration signals supplied from the respective n interval integration circuits and generating a detection signal indicating a synchronization timing position corresponding to the detected maximum peak position, the detection signal being used to extract the effective symbol period with a precise timing corresponding to the maximum peak position; and an offset compensation signal generator for generating the offset compensation signal to be supplied to the timing controller such that the synchronization timing signal is compared with the detection signal outputted from the detection circuit to measure a synchronization timing error and the measured result is supplied as the offset compensation signal to the timing controller.

In the present invention, the delay circuit delays the received OFDM signal by an amount equal to one effective symbol period. The delayed OFDM signal is supplied to the calculation circuit to determine the correlation with the no-delayed OFDM signal.

The signal outputted from the calculation circuit is inputted to the moving integration circuit to calculate the total sum over the entire guard period. The resultant signal is supplied to the frame guard removing circuit.

upon receiving the signal outputted from the moving integration circuit, the frame guard removing circuit removes the frame guard period from the frame period in the received OFDM signal and outputs the resultant signal.

The signal outputted from the frame guard removing circuit is supplied to the interval integration circuit. In the interval integration circuit, the signal outputted from the frame guard removing circuit is cumulatively added in units of time slot periods, and the result of the interval integration is supplied to the detection circuit.

The detection circuit detects, for example, a guard period, by detecting a maximum peak from the result of the interval integration performed in units of time slot periods thereby detecting the synchronization point. Thus, at the point of time when the maximum peak is detected, the detection circuit generates a detection signal indicating the synchronization timing position at which the effective symbol period should be extracted.

The detection signal outputted from the detection circuit is supplied to the offset compensation signal generator. The offset compensation signal generator compares the synchronization timing signal indicating the timing of extracting the effective symbol period with the detection signal outputted from the detection circuit to measure the synchronization timing error, and the offset compensation signal generator generates an offset compensation signal depending upon the measurement result.

The offset compensation signal generated by the offset compensation signal generator is supplied to, for example, the timing controller in the demodulating apparatus.

The timing controller corrects the synchronization timing on the basis of the supplied offset compensation signal.

The effective symbol period is extracted from the received OFDM signal in synchronization with the corrected synchronization timing signal, and data is demodulated.

BRIEF DESCRIPTION OF THE DRAWINGS

FIG. 3 is a diagram illustrating an example of a format of an OFDM signal including a frame guard according to the present invention;

DESCRIPTION OF THE PREFERRED EMBODIMENTS

Figure 1:
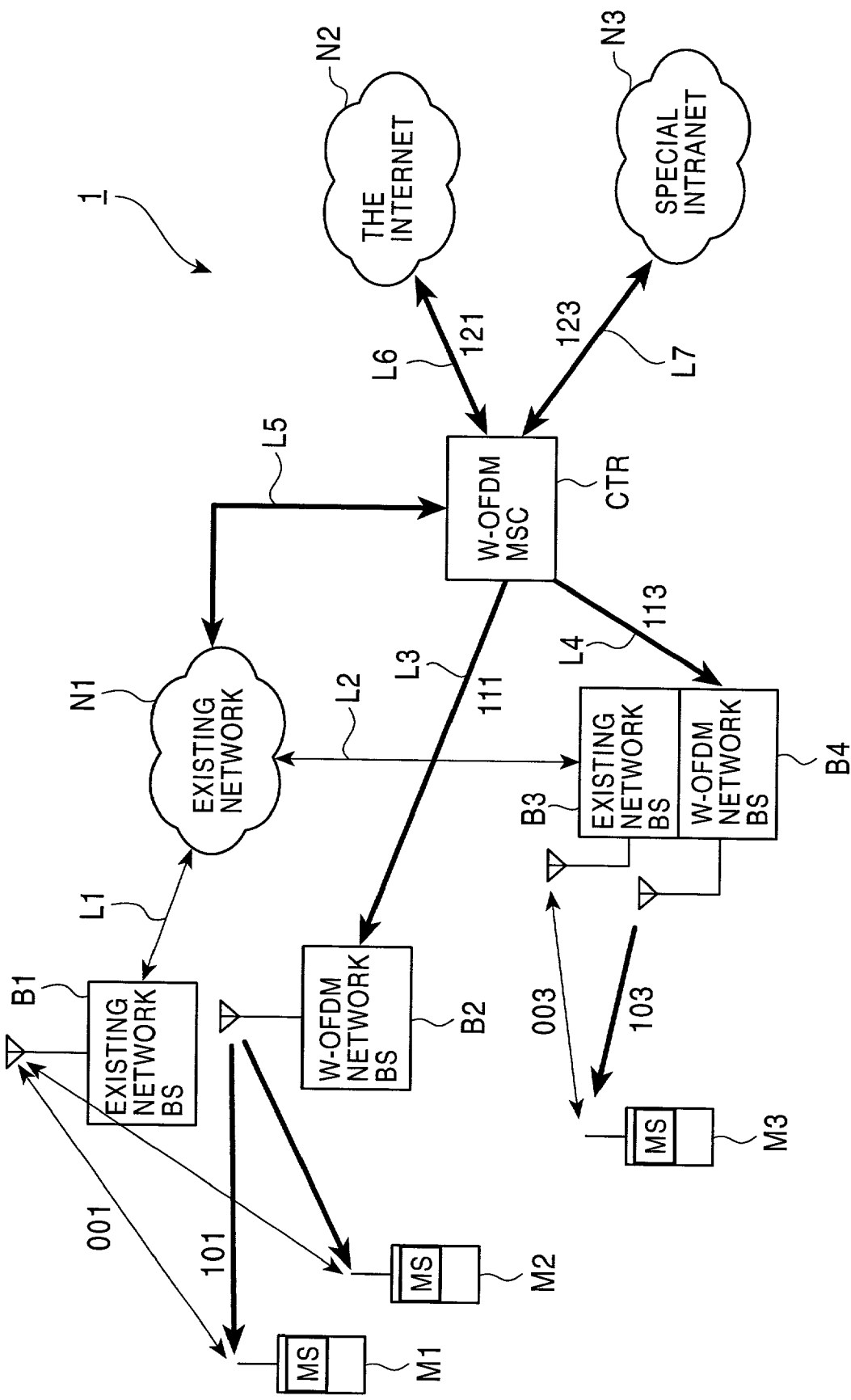
FIG. 1 is a diagram illustrating an example of a construction of an OFDM communication system including a reception synchronization apparatus according to the present invention.

FIG. 1 is a diagram illustrating an example of a construction of an OFDM communication system including a reception synchronization apparatus according to the present invention.

This OFDM communication system 1 mainly includes mobile stations (MS) M1 to M3, base satiations (BS) B1 to B4, an existing cellular cable network N1, a data communication network N2 such as the Internet, a data communication network N3 having a downlink database, and a control center (or mobile routing center) CTR for controlling the additional downlink network.

The base station B1 has functions of a conventional cellular base station and also has functions of an additional downlink. The base station B3 has functions of an additional downlink. The cable network N1 is connected to the base stations B1 and B2, for example, via cable communication lines L1 and L2.

The control center CTR is connected to the base stations B1 and B3 via communication lines L3 and L4.

The control center CTR is also connected to the network N1 via a communication line L5, to the data communication network N2 via a communication line L6, and to the data communication network N3 via a communication line L7.

The OFDM communication system 1 is constructed so as to satisfy the following requirements.

That is, in recent years, mobile communication using a portable telephone or the like has become increasingly popular, and mobile communication is used to transmit not only information with a small data size such as voice data but also information with a large data size such as a digital content.

In transmission of such digital data, it is required to transmit information with a much greater data size than information transmitted from an individual.

To handle such a large data size, an additional downstream line (i.e., a downlink for use of transmission in a direction from a base station to a mobile station) is provided in such a manner that the downlink line is overlaid on the existing cellular network.

This downlink is designed to be capable of transmitting a greater amount of information than the existing cellular network.

In this portable telephone communication system, a low bit rate signal such as a control signal from a mobile station of a user is transmitted using the existing cellular network, and a high bit rate signal such as digital data to be downloaded is transmitted at a high transmission rate via the additional downlink.

In the OFDM communication system 1, cells are constructed, for example, as shown in FIG. 2.

In FIG. 2, each solid line indicates an area (cell) within which a conventional portable telephone base station can communicate with a mobile station, and each dotted line indicates an area (cell) within which a wideband radio (W-OFDM) communication system, which is additionally provided for exclusive use of downlink communication, can communicate with a mobile station.

Figure 2A:
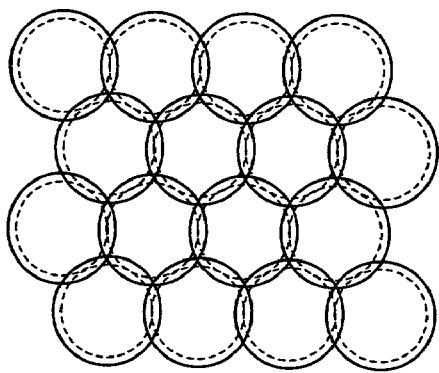
FIGS. 2A to 2F are diagrams illustrating manners of forming cells in the communication system shown in FIG. 1.
Figure 2B:
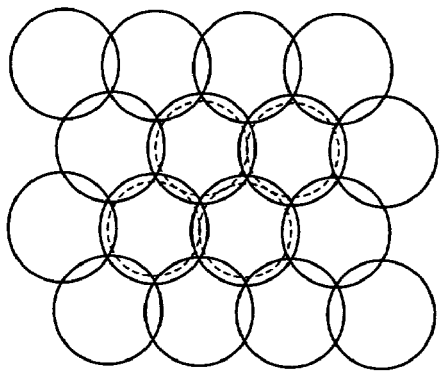
Figure 2C:
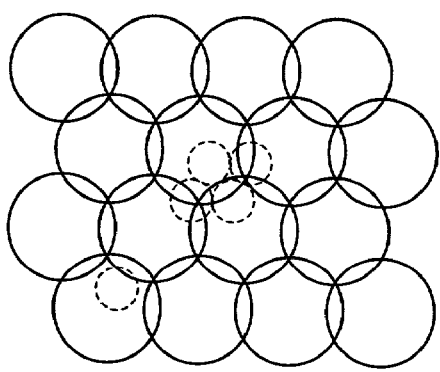
Figure 2D:
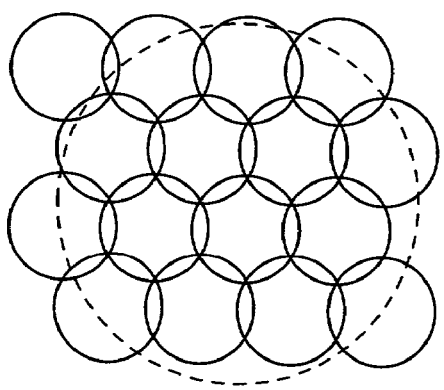
Figure 2E:
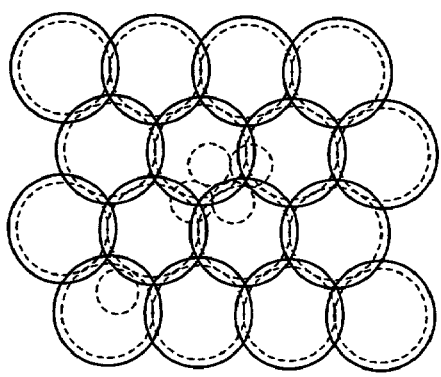
Figure 2F:
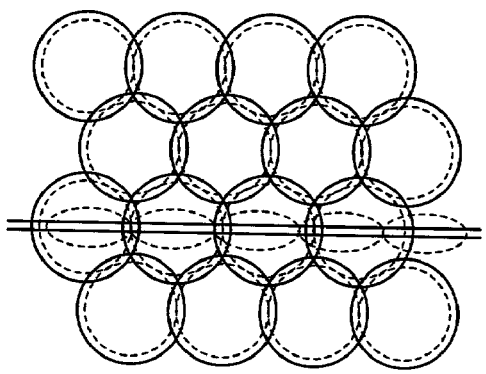

More specifically, W-OFDM base stations may be disposed in the following manners. A first manner is, as shown in FIG. 2A, to dispose W-OFDM base stations in all cells where existing portable telephone base stations are disposed so that the cell structure of W-OFDM base stations become similar to the existing cell structure. A second manner is, as shown in FIG. 2B, to dispose W-OFDM base stations only in areas where there are many users. A third manner is, as shown in FIG. 2C, to dispose, in areas where there are many users, W-OFDM base stations whose output power is smaller than existing base stations, so that the cell sizes covered by W-OFDM base stations become smaller (that is, micro cells are formed) than the existing cell sizes. A forth manner is, as shown in FIG. 2D, to dispose W-OFDM base stations whose output power is greater than existing base stations so that greater-sized cells are formed. A fifth manner is, as shown in FIG. 2E, a mixture of manners shown in FIGS. 2B and 2C (overlaid cell system). A sixth manner is, as shown in FIG. 2F, to form micro cells along main roads.

In the present embodiment, for example, the manner shown in FIG. 2A is employed. That is, W-OFDM base stations are disposed in a similar manner as existing base stations so as to form cells similar to existing cells.

In the W-OFDM communication system 1, mobile stations M1 to M4 transmit and receive control signals or the like via the existing cellular system, while transmission of data in the downstream direction to mobile stations is performed via the W-OFDM system. As described above, the W-OFDM communication system has a larger transmission capacity than the conventional cellular telephone system.

Radio channels used by W-OFDM base stations are assigned to the respective base stations such that interference due to use of the same channel is suppressed to as low a level as possible and such that radio channels can be used in an efficient manner. The base stations B1 to B3 are synchronized so that frames are transmitted with the precisely synchronized timing.

An example of a communication process performed in the OFDM communication system 1 shown in FIG. 1 is described below.

For example, if the mobile station M1 issues a data download request to be transmitted to the control center CTR, a signal (001) is outputted in a format adapted to the existing system from the mobile station M1 and transmitted to the base station B1.

This request signal is then transmitted to the control center CTR via the existing cellular network N1.

In response to receiving the data download request, the control center CTR acquires the requested data (121) from the data communication network N2 via the communication line L6 and transmits the acquired data (121) as data (111), whose final destination is the mobile station M1, to the base station B2 via the communication line L3.

If the base station B2 receives this data (111), the base station B2 transmits it as data (101) in a format adapted to the additional downlink to the mobile station M1.

Thus, the mobile station M1 finally receives the requested data (101).

In the case where, for example, a data download request to be transmitted to the control center CTR is issued by the mobile station M3, a signal (003) is outputted in the format adapted to the existing system from the mobile station B3 and transmitted to the base station B3.

This request signal is then transmitted to the control center CTR via the existing cellular network N1.

In response to receiving the data download request, the control center CTR acquires the requested data (123) from the data communication network N3 provided for exclusive use by the additional downlink via the communication line L7. To deliver the acquired data (123) to the mobile station M3, the control center CTR transmits the acquired data (123) as data (113) to the base station B4 provided for exclusive use by the additional downlink via the communication line L4.

If the base station B4 receives the data (113), the base station B4 transmits it as data (103) in the format adapted to the additional downlink to the mobile station M3.

Thus, the mobile station M3 finally receives the requested data (103).

In the above-described OFDM communication system 1, an OFDM signal transmitted to one of mobile stations M1 to M4 is generated such that each frame FRM includes three time slot periods TSLT and one frame guard period TFGD, as shown in FIG. 3.

In FIG. 3, TFRM, TSLT, and TFGD denote a frame period, a time slot period, and a frame guard period, respectively.

The frame guard FGD includes no signal, and, in the present embodiment, is added to a frame FRM, at the end of a series of three time slots.

The respective base stations B1 to B3 transmits signals in units of frames each including three time slots SLT and one frame guard FGD such that the transmission timings become coincident with each other.

In the present embodiment, a frame guard period TFGD is placed at the end of a frame. Alternatively, a frame guard period TFGD may be placed at the beginning of a frame, or frame guard periods TFGD may be placed at both the beginning and the end of a frame.

Each time slot SLT included in a frame FRM is produced by adding a guard GD to an effective symbol period TSBL.

Figure 4:
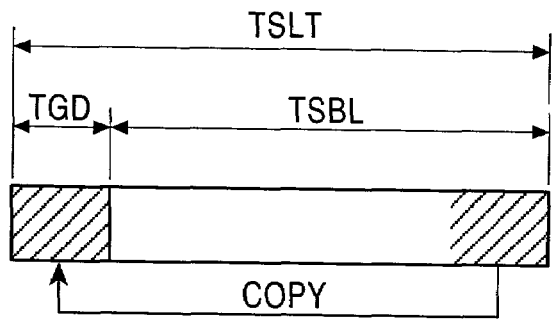
FIG. 4 is a diagram illustrating a method of forming a time slot of an OFDM signal so as to include a guard, in accordance with the present invention.
Figure 5:
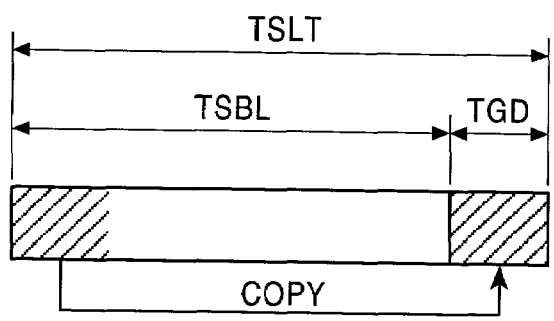
FIG. 5 is a diagram illustrating a method of forming a time slot of an OFDM signal so as to include a guard, in accordance with the present invention.
Figure 6:
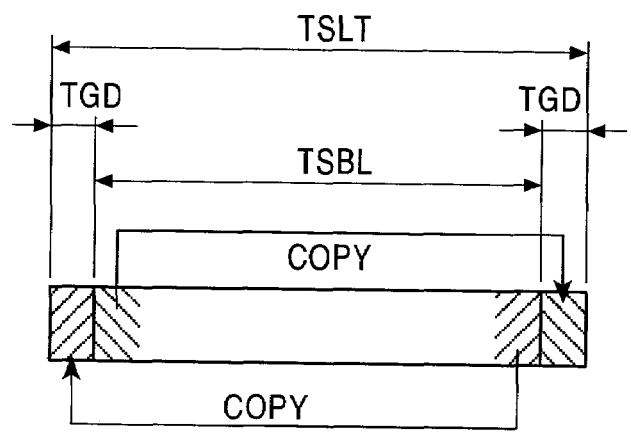
FIG. 6 is a diagram illustrating a method of forming a time slot of an OFDM signal so as to include a guard, in accordance with the present invention.

More specifically, each time slot SLT including an additional guard GD may be produced, as shown in FIGS. 4 to 6, by connecting the same signal as a predetermined length of head or tail end part of a signal in an effective symbol period to an opposite end of that effective symbol period or by connecting the same signals as predetermined length of both head and tail end parts of a signal in an effective symbol period to opposite ends of the effective symbol period. More specifically, in the example shown in FIG. 4, the same signal as a signal at a tail end part of an effective period TSBL is connected to the head end of the effective symbol period. In the example shown in FIG. 5, the same signal as a signal at a head end part of an effective period TSBL is connected to the tail end of the effective symbol period, or otherwise. In the example shown in FIG. 6, the same signals as signals at head and tail end parts of an effective period are respectively connected to the tail and head ends of the effective symbol period.

In the example shown in FIG. 3, the time slot is produced by the method shown in FIG. 4.

As described above, in each of mobile stations M1 to M3 so as to be capable of for receiving an OFDM signal including frames each including a series of time slots and a guard period TFGD added to the series of time slots, the reception synchronization apparatus capable of achieving precise synchronization of the OFDM signal including frame guard periods is disposed.

Specific constructions and functions of the reception synchronization apparatus disposed in each of mobile stations M1 to M3 are described below with reference to the drawings.

Figure 7:
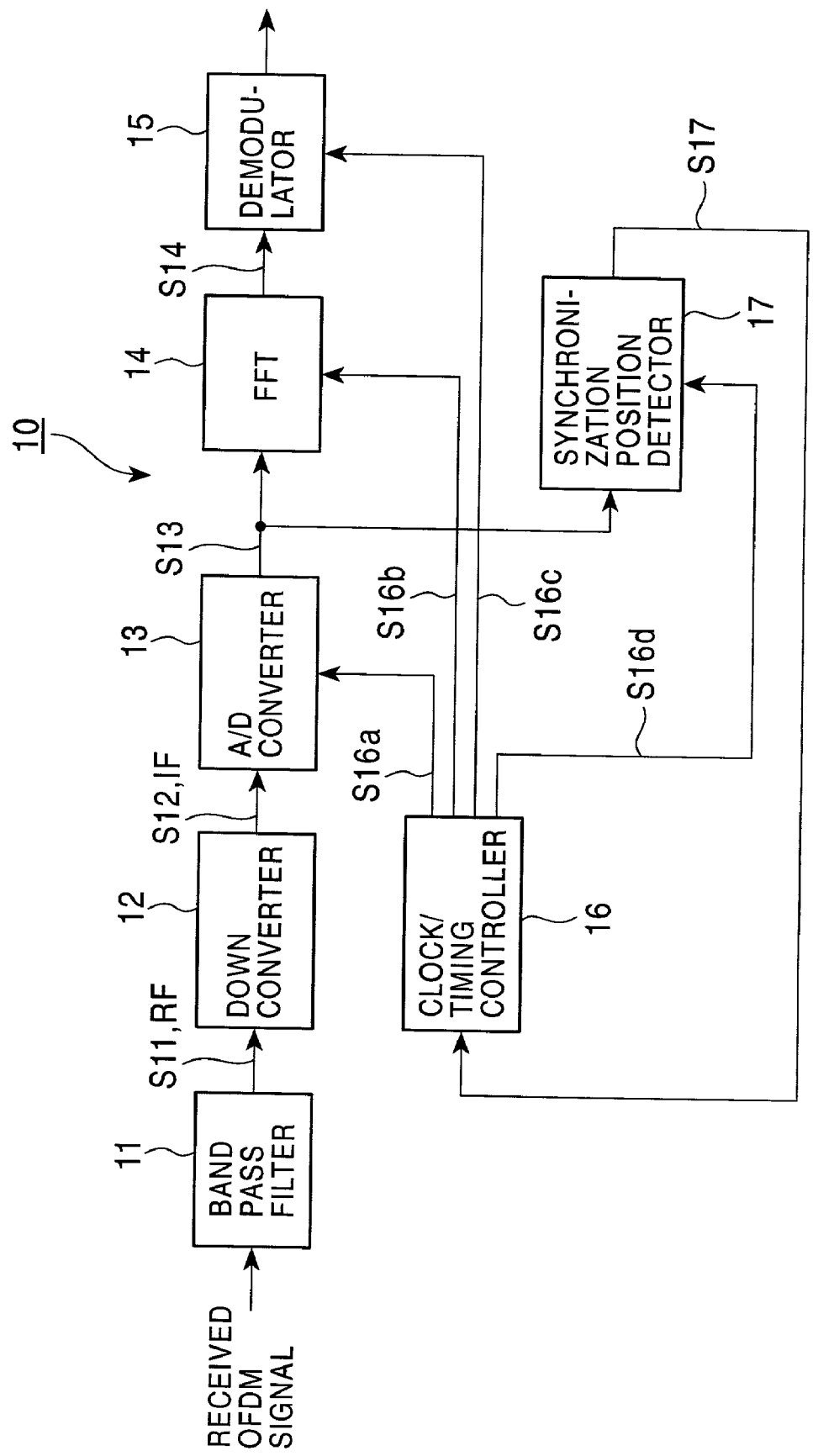
FIG. 7 is a block diagram illustrating an embodiment of an OFDM demodulating apparatus including a reception synchronization apparatus according to the present invention.

FIG. 7 is a block diagram illustrating an embodiment of an OFDM demodulating apparatus including a reception synchronization apparatus according to the present invention.

This OFDM demodulating apparatus 10 includes, as shown in FIG. 7, a bandpass filter 11, a down converter 12, an analog-digital (A/D) converter 13, a FFT (Fast Fourier Transform) unit 14, a demodulator 15, a clock/timing controller 16, and a synchronization position detector 17.

The bandpass filter 11 extracts only components within a necessary frequency band from an OFDM signal received via an antenna (not shown), that is, the bandpass filter 11 removes noise components outside the necessary frequency bands, and outputs the resultant RF (Radio Frequency) signal S11 to the down converter 12.

The down converter 12 converts the RF signal S11 supplied from the bandpass filter 11 into an IF (Intermediate Frequency) signal and outputs the resultant IF signal S12 to the A/D converter 13.

In accordance with a clock signal S16a supplied from the clock/timing controller 16, the A/D converter 13 converts the IF signal S12 supplied from the down converter 12 into a digital signal and outputs the resultant digital signal S13 to the FFT unit 14 and the synchronization position detector 17.

The FFT unit 14 performs a FFT, i.e., first demodulation process, on the digital signal S13 supplied from the A/D converter 13 and outputs the result as a signal S14 to the demodulator 15.

In the above process, the FFT unit 14 performs the FFT in accordance with the timing signal S16b that is supplied from the clock/timing controller 16 to indicate the start position of the digital signal to be subjected to the FFT.

In accordance with a clock signal S16c supplied from the clock/timing controller 16, the demodulator 15 performs a second demodulation process on the signal S14 supplied, as the result of the FFT, from the FFT unit 14, thereby demodulating the received OFDM signal.

The clock/timing controller 16 supplies the sampling clock S16a to the A/D converter 13, the timing signal S16b to the FFT unit 14 to indicate the start position of the digital signal to be subjected to the FFT, the clock signal S16c to the demodulator 15, and the pre-synchronization timing signal S16d to the synchronization position detector 17.

This timing signal S16b is transmitted in the form of a pulse from the clock/timing controller 16 immediately when the start of an effective symbol period of the received OFDM signal, that is, the first bit (first point) of the digital signal to be subjected to the FFT process is inputted to the FFT unit 14.

As described above, the time slot period TSLT, the effective symbol period TSBL, the frame period TFRM, and the frame guard period TFGD are respectively predetermined to have particular fixed values, and the clock/timing controller 16 transmits the FFT timing signal S16b in fixed intervals in accordance with the predetermined above values.

At a time immediately after activating the demodulator, the FFT timing position is unknown. Therefore, the clock/timing controller 16 transmits a timing signal with an arbitrary timing.

The clock/timing controller 16 corrects the synchronization timing in accordance with the offset compensation signal S17 supplied from the synchronization position detector 17 and transmits the corrected FFT timing signal S16b to the FFT unit 14.

Upon receiving the digital signal S13 from the A/D converter 13, the synchronization position detector 17 detects the FFT timing, that is, the start position of an effective symbol period. More specifically, the synchronization position detector 17 detects the first point of the digital signal in the effective symbol period.

The synchronization position detector 17 compares the detected FFT timing, that is, the synchronization timing with the pre-synchronization timing signal S16d supplied from the clock/timing controller 16 and produce an offset compensation signal indicating the error of the pre-synchronization timing with respect to the true synchronization timing. The resultant offset compensation signal is fed back to the clock/timing generator 16.

Thus, in the present embodiment, the synchronization position detector 17 makes it possible to achieve precise synchronization of the received OFDM signal including the frame guard.

Figure 8:
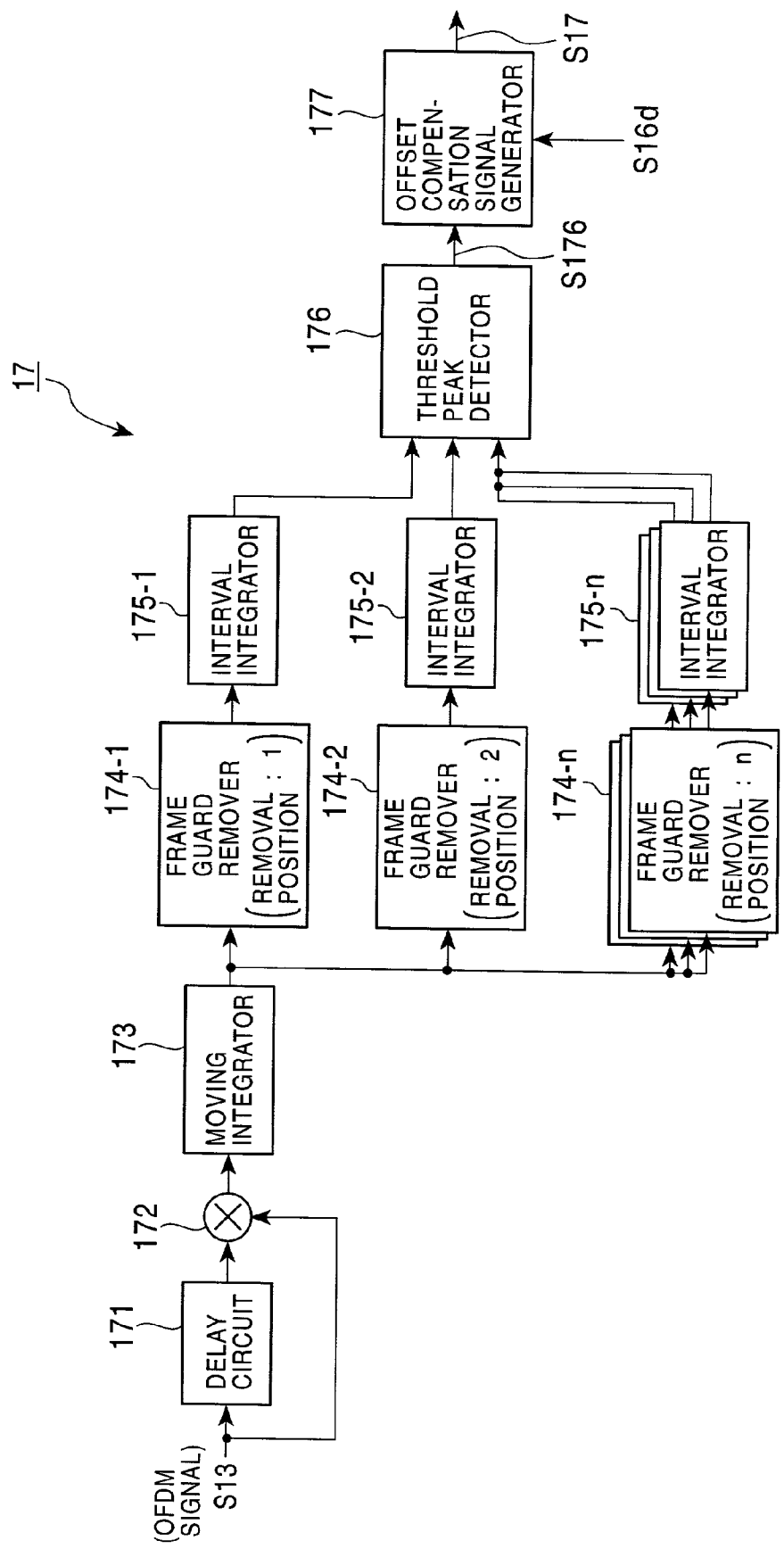
FIG. 8 is a block diagram illustrating a specific example of a construction of the synchronization position detector serving as a reception synchronization apparatus according to the present invention.
Figure 9:
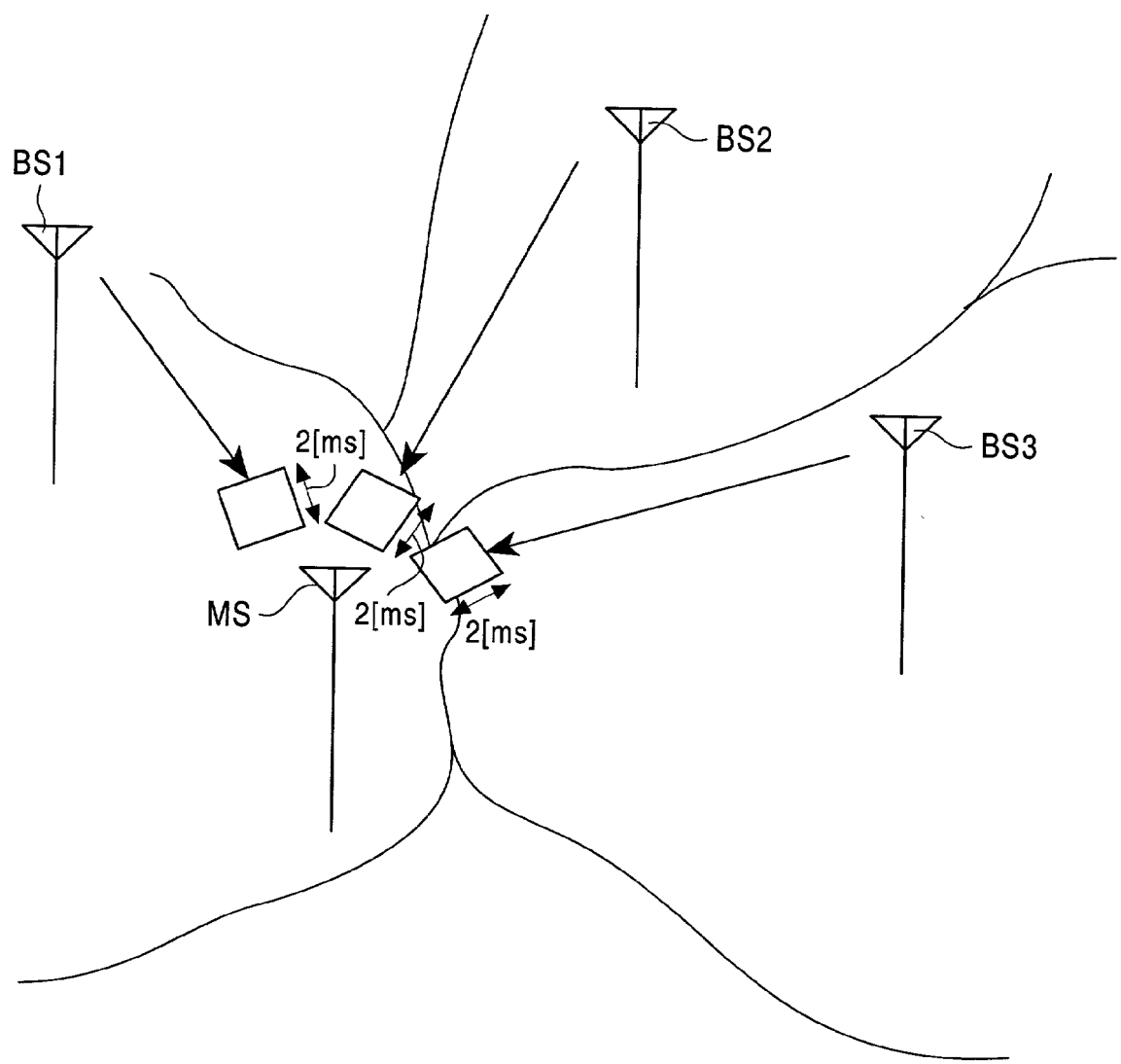
FIG. 9 is a diagram illustrating a mobile communication system.
Figure 10:
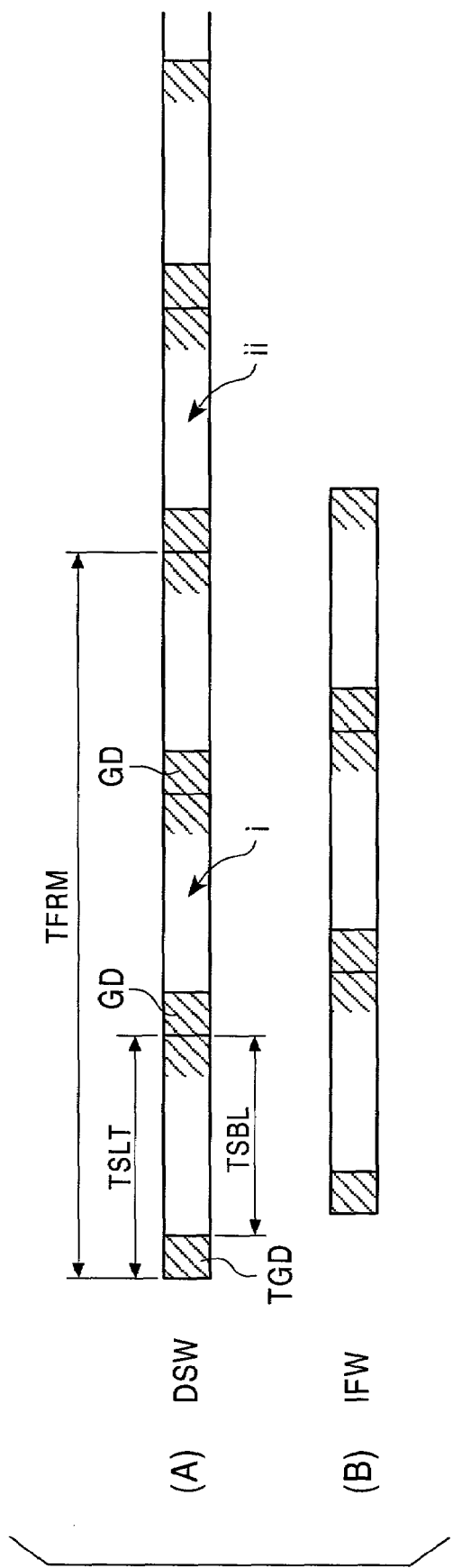
FIG. 10 is a diagram illustrating an example of a conventional format of an OFDM signal used in an OFDM transmission system.
Figure 11:
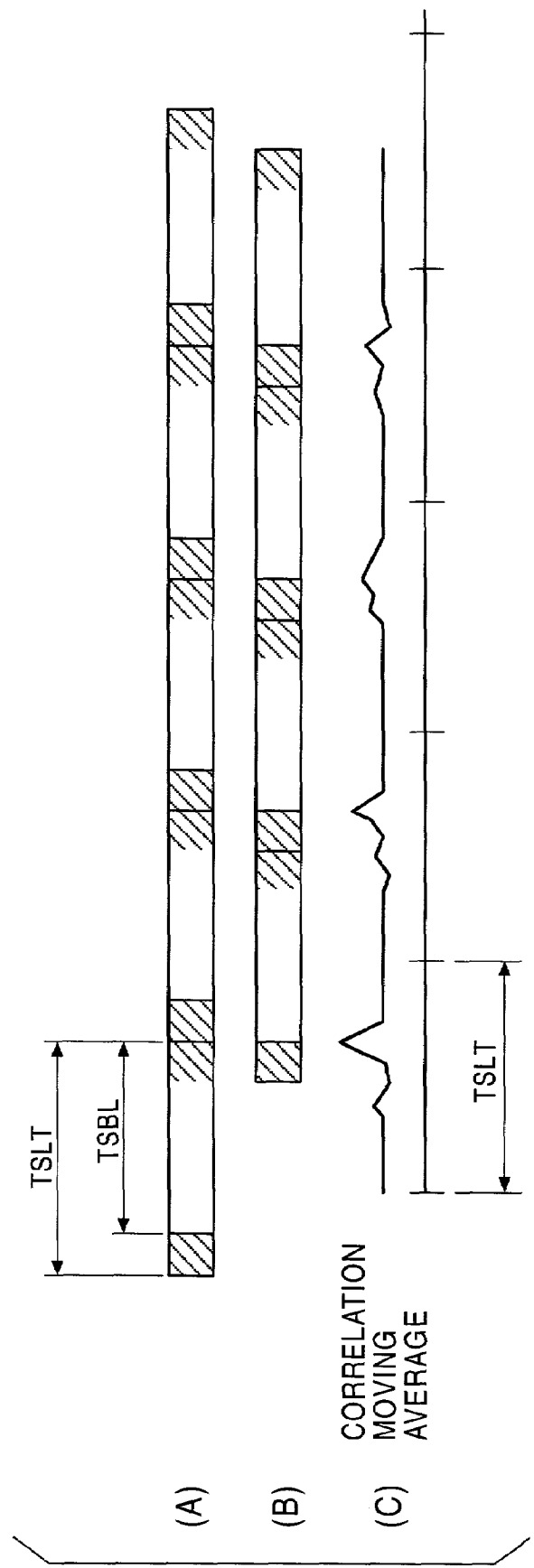
FIG. 11 is a diagram illustrating a signal processing performed by a receiving system in a conventional mobile station.
Figure 12:
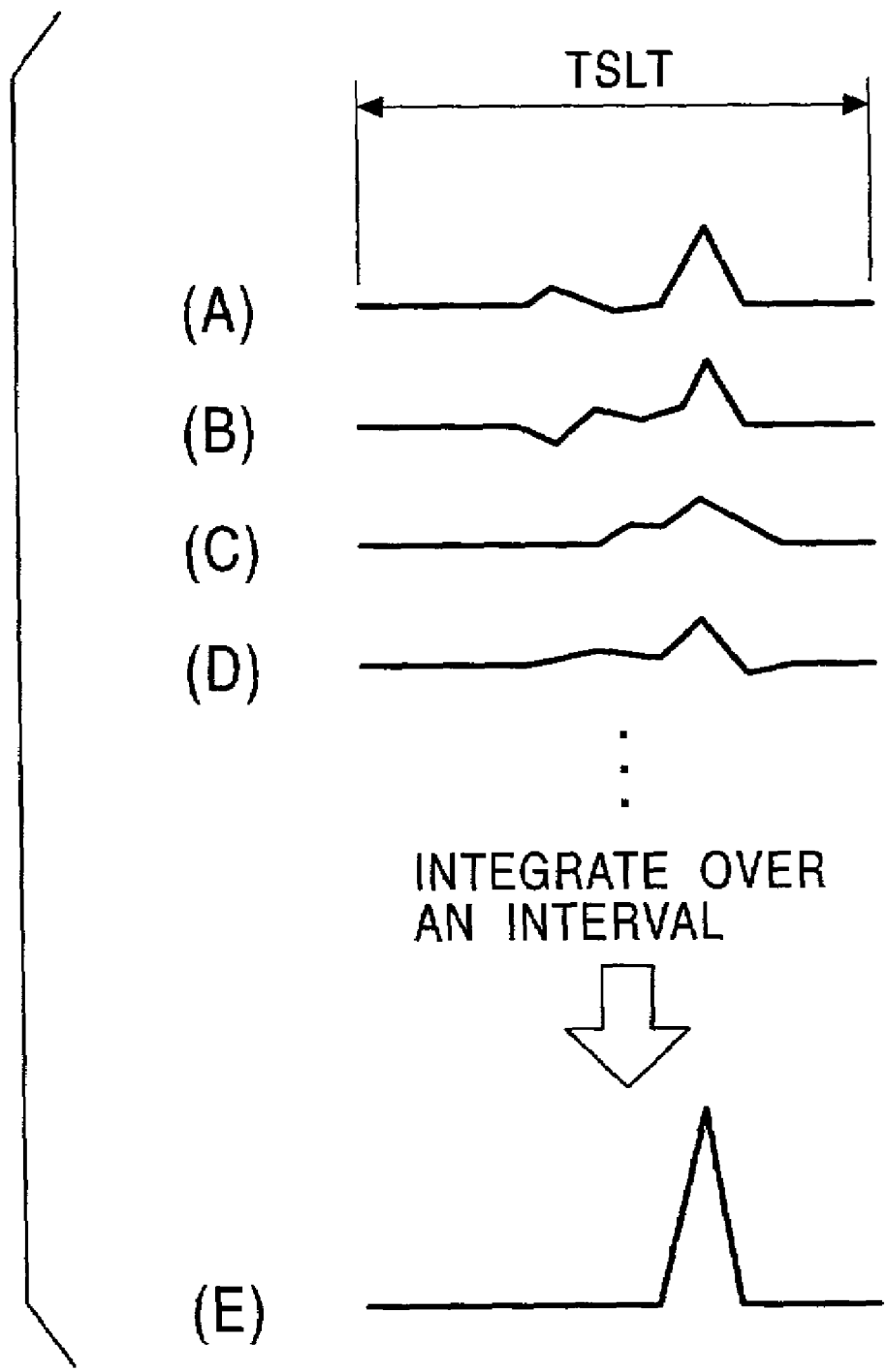
FIG. 12 is a diagram illustrating an interval integration process performed by an OFDM demodulating apparatus, according to a conventional technique.
Figure 13:
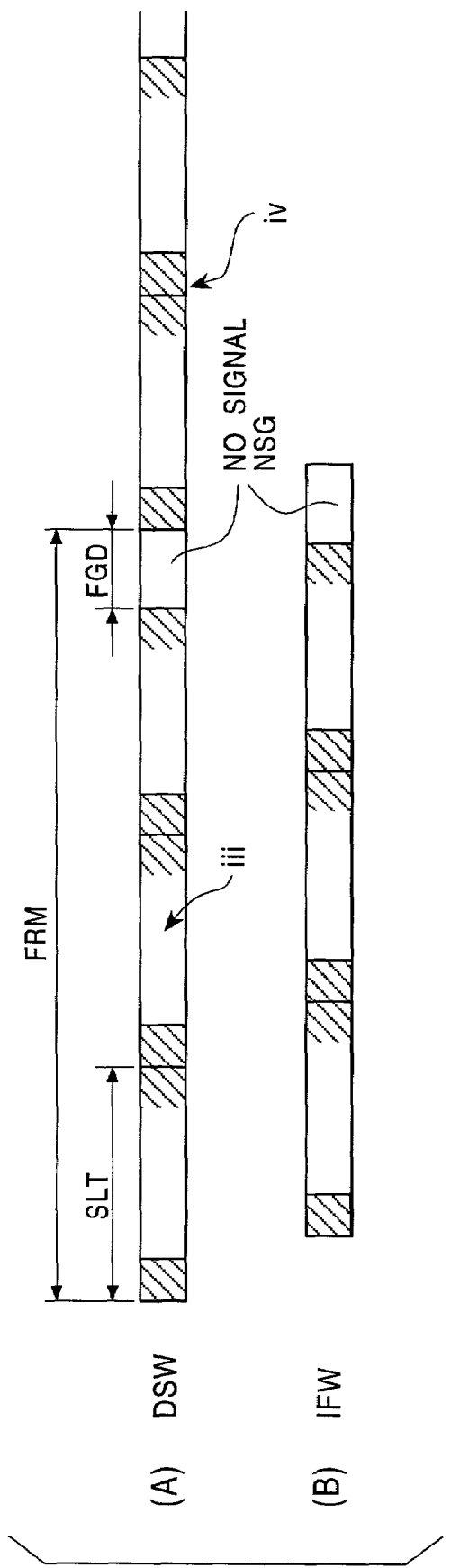
FIG. 13 is a diagram illustrating an advantage of an OFDM signal including a frame guard period.
Figure 14:
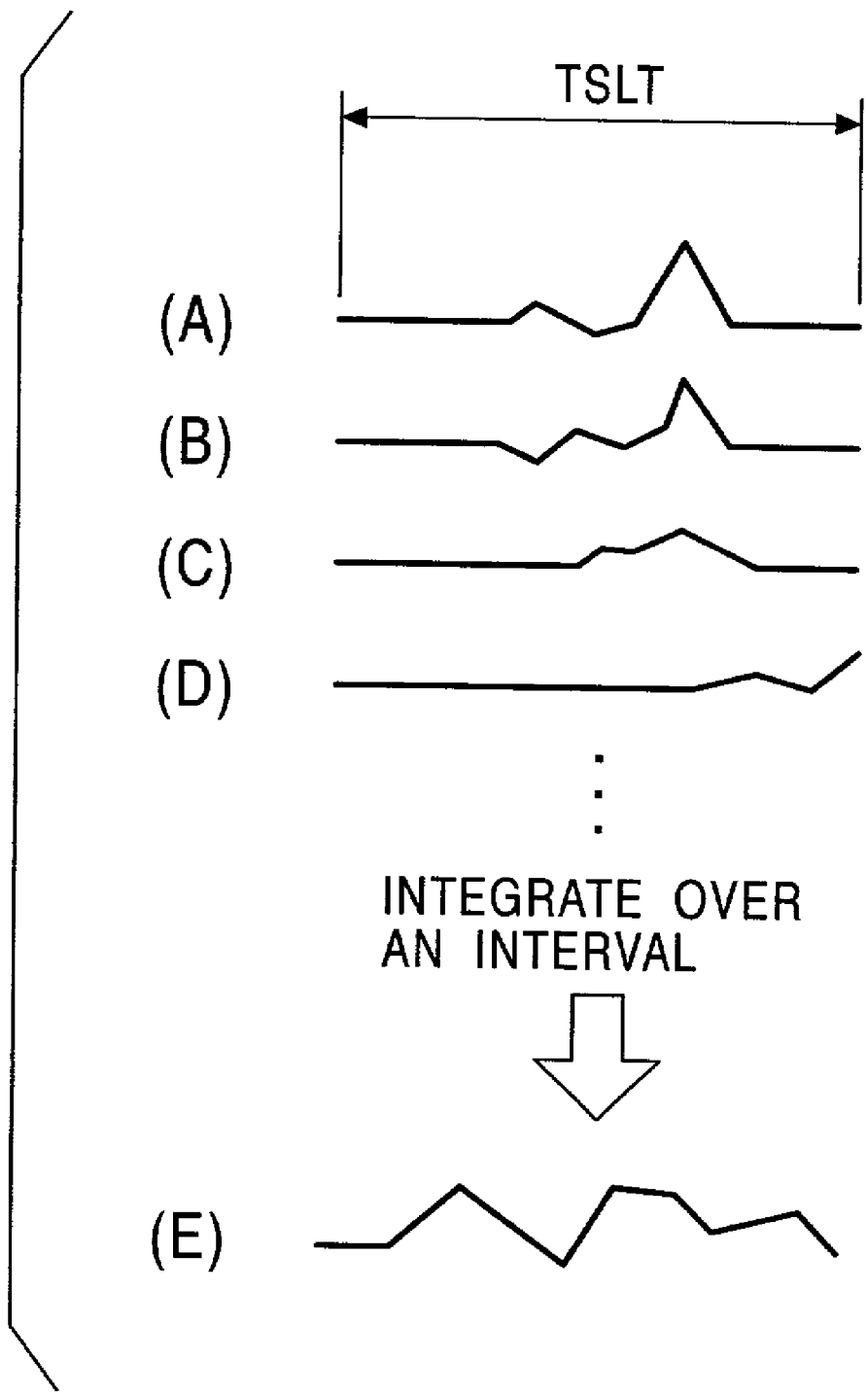
FIG. 14 is a diagram illustrating a problem that occurs when an OFDM signal including a frame guard period is received by an OFDM demodulating apparatus according to a conventional technique.

FIG. 8 is a block diagram illustrating a specific example of a construction of the synchronization position detector 17 serving as a reception synchronization apparatus according to the present invention.

As shown in FIG. 8, the synchronization position detector 17 includes a delay circuit 171, a calculation circuit serving as a multiplier 172, a moving integration circuit 173, n frame guard removing circuits 174-1 to 174-n, n interval integration circuits 175-1 to 175-n, a threshold peak detector 176, and an offset compensation signal generator 177.

The delay circuit 171 delays the OFDM signal supplied as the digital signal S13 from the A/D converter 13, by an amount equal to one effective symbol period, that is, by an amount corresponding to the number of points included in the effective symbol interval. The resultant delayed signal is supplied to the multiplier 172.

The multiplier 172 calculates, for example, a complex conjugate product between the digital signal S13 supplied from the A/D converter 14 and the signal S171 delayed by the delay circuit 171 by an amount corresponding to the number of points included in the effective symbol period.

In a specific embodiment, the delay circuit 171 includes a memory having a capacity large enough to store a digital signal in an effective symbol period and sequentially writes the digital signal S13 outputted from the A/D converter 13.

If the number of points of the digital signal included in the effective symbol period is equal to n, the delay circuit 172 sequentially writes into the memory the digital signal S13 outputted from the A/D converter 13, starting from the first point thereof. If the nth point of the digital signal has been written into the memory, the first point of the digital signal is read from the memory and outputted when the (n+1)th point of the digital signal is written into the memory.

The multiplier 172 calculates the complex conjugate product between the first point of the digital signal outputted from the memory of the delay circuit 171 and the (n+1)th point of the digital signal. The multiplier 172 then calculates the complex conjugate product between the 2nd point and the (n+2)th point. Thereafter, complex conjugate products are calculated for the following points in a similar manner.

The moving integration circuit 173 calculates the total sum of the digital signals in the guard period supplied as the result of the complex conjugate multiplication from the multiplier 172. The calculated sum is outputted to the frame guard removing units 174-1 to 174-n. The moving integration circuit 173 starts the calculation of the total sum at the first point inputted to the moving integration circuit 173, and the starting position of the calculation is sequentially shifted by one point.

In a specific embodiment, the moving integration circuit 173 includes a memory having a capacity large enough to store a digital signal in a guard period and sequentially writes the result of the complex conjugate multiplication into the memory. If the number of points of the digital signal included in the guard period is equal to n, the moving integration circuit 173 sequentially writes into the memory the signal outputted from the complex conjugate multiplier 172, starting from the first point. At the same time, the moving integration circuit 173 calculates the cumulative sum of the first point, the second point, the third point, and so on.

The moving integration circuit 173 stores the cumulative sum in a memory space or a register different from the above-described memory. The moving integration circuit 173 reads and outputs the first point of the digital signal from the memory when the (n+1)th point of the digital signal is added. Thereafter, the first point of the digital signal is reduced from the cumulative sum calculated for the range of the first point to the (n+1) to point. The moving integration circuit 173 stores the (n+1)th point of the digital signal into the memory so that the (n+1)th point is overwritten at the memory address at which the 1st point of the digital signal is stored. Thereafter, the (n+2)th point is added, the 2nd point of the digital signal is read and outputted from the memory, the 2nd point of the digital signal is reduced from the cumulative sum, and the (n+1)th point of the digital signal is overwritten into the memory. After that, the process is repeated in a similar manner.

The number of frame guard removing circuit 174-1 to 174-n is set to be equal to the number of time slots included in each frame, and interval integration circuits 175-1 to 175-n are provided in correspondence with the frame guard removing circuits 174-1 to 174-n.

In this specific embodiment, each frame includes three time slots, and thus there are three frame guard removing circuits and corresponding three interval integration circuits.

The frame guard removing circuit 174-1 removes, from the signal outputted from the moving integration circuit 173, a frame guard in a 1st one of the time slot periods appearing after starting the synchronization process. More specifically, the frame guard removing circuit 174-1 neglects the signal during the frame guard period in the first time slot period appearing after starting the synchronization process and outputs the resultant signal to the interval integration circuit 175-1.

The frame guard removing circuit 174-2 removes, from the signal outputted from the moving integration circuit 173, a frame guard in a 2nd one of the time slot periods appearing after starting the synchronization process and outputs the resultant signal to the interval integration circuit 175-2.

The frame guard removing circuit 174-n (n=3, in this specific embodiment) removes, from the signal outputted from the moving integration circuit 173, a frame guard in a nth one of the time slot periods appearing after starting the synchronization process and outputs the resultant signal to the interval integration circuit 175-n.

The interval integration circuit 175-1 divides the digital signal supplied from the frame guard removing circuit 174-1 into segments each having an interval equal to the time slot period, and calculates the cumulative sum of the segments of the digital signal. The resultant cumulative sum is outputted to the threshold peak detector 176.

The interval integration circuit 175-2 divides the digital signal supplied from the frame guard removing circuit 174-2 into segments each having an interval equal to the time slot period, and calculates the cumulative sum of the segments of the digital signal. The resultant cumulative sum is outputted to the threshold peak detector 176.

The interval integration circuit 175-n (n=3, in this specific embodiment) divides the digital signal supplied from the frame guard removing circuit 174-n into segments each having an interval equal to the time slot period, and calculates the cumulative sum of the segments of the digital signal. The resultant cumulative sum is outputted to the threshold peak detector 176.

A specific embodiment is described below.

In this specific embodiment, it is assumed that the number of points of the digital signal in each time slot period is equal to n, the number of points of the digital signal in each frame guard period is equal to m.

After starting the synchronization process, if the digital signal outputted from the moving integration circuit 173 is inputted to the frame guard removing circuit 174-1, the frame guard removing circuit 174-1 neglects first point to the mth points of the inputted signal. Thereafter, the frame guard removing circuit 174-1 directly outputs the following (3×n) points of the digital signal and neglects m points of the digital signal following them. Thereafter, the frame guard removing circuit 174-1 directly outputs the further following (3×n) points of the digital signal. After that, the process is repeated in a similar manner.

The interval integration circuit 175-1 includes a memory having a capacity large enough to store n points of the digital signal. However, the first point to the mth point of the digital signal are not stored into the memory because they are removed by the frame guard removing circuit 174-1.

The frame guard removing circuit 174-1 outputs the (m+1)th point to the (m+1)+(3×n)th point of the digital signal to the interval integration circuit 175-1.

The interval integration circuit 175-1 sequentially writes the (m+1)th point to the (m+n)th point into the memory. The interval integration circuit 175-1 adds the (m+n+1) points of data to the (m+1) points of the digital signal stored in the memory, and overwrites the results at the memory addresses at which the (m+1) points of the digital signal are stored.

The interval integration circuit 175-1 performs the above-described process repeatedly thereby obtaining the cumulative sum of the segments of the digital signal each having an interval equal to the time slot period.

The frame guard removing circuit 174-2 neglects the (n+1)th point to the (n+m)th points of the digital signal. Thereafter, the frame guard removing circuit 174-2 neglects m points of the digital signal appearing in intervals of (3×n) points. That is, (3×n) points of the digital signal are directly outputted, and the following m points of the digital signal are neglected. (3×n) points of the digital signal following them are outputted. After that, the process is repeated in a similar manner.

The interval integration circuit 175-2 includes a memory having a capacity large enough to store n points of the digital signal. However, the (n+1)th point to the (n+m)th point of the digital signal are not stored into the memory because they are removed by the frame guard removing circuit 174-2.

The frame guard removing circuit 174-2 outputs the (n+m+1)th point to the (n+m+1)+(3×n)th point of the digital signal to the interval integration circuit 175-2. The interval integration circuit 175-2 sequentially writes the (n+m+1)th point to the (n+m+n)th point into the memory. The interval integration circuit 175-2 adds the (n+m+n+1) points of data to the (n+m+1) points of the digital signal stored in the memory, and overwrites the results at the memory addresses at which the (n+m+1) points of the digital signal are stored.

The interval integration circuit 175-2 performs the above-described process repeatedly thereby obtaining the cumulative sum of the segments of the digital signal each having an interval equal to the time slot period.

The frame guard removing circuit 174-3 neglects the (2×n+1)th point to the (2×n+m)th points of the digital signal. Thereafter, the frame guard removing circuit 174-3 neglects m points of the digital signal appearing in intervals of (3×n) points. That is, (3×n) points of the digital signal are directly outputted, and the following m points of the digital signal are neglected. (3×n) points of the digital signal following them are outputted. After that, the process is repeated in a similar manner.

The interval integration circuit 175-3 includes a memory having a capacity large enough to store n points of the digital signal. However, the (2×n+1)th point to the (2×n+m)th point of the digital signal are not stored into the memory because they are removed by the frame guard removing circuit 174-3. The frame guard removing circuit 174-3 outputs the (2×n+m+1)th point to the (2×n+m+1)+(3×n)th point of the digital signal to the interval integration circuit 175-3. The interval integration circuit 175-3 sequentially writes the (2×n+m+1)th point to the (2×n+m+n)th point into the memory. The interval integration circuit 175-3 adds the (2×n+m+n+1) points of data to the (2×n+m+1) points of the digital signal stored in the memory, and overwrites the results at the memory addresses at which the (2×n+m+1) points of the digital signal are stored. The interval integration circuit 175-3 performs the above-described process repeatedly thereby obtaining the cumulative sum of the segments of the digital signal each having an interval equal to the time slot period.

As described above, the frame guard removing circuits 174-1 to 174-n according to the present embodiment do not detect the true frame guard position to remove the frame guard, but remove data in a period, equal to the frame guard period, at a position where the frame guard is expected to exist.

The threshold peak detector 176 monitors the integration results of the interval integration circuits 175-1 to 175-n. If the interval integration result of a certain interval integration circuit is detected to be greater than a threshold value, the threshold peak detector 176 detects a peak of this interval integration result.

At the time when the threshold peak detector 176 has detected the peak, the threshold peak detector 176 outputs a detection signal S176 in the form of a pulse to the offset compensation signal generator 177.

The offset compensation signal generator 177 compares the detection signal S176 in the pulse form with the pre-synchronization timing signal S16d supplied from the clock/timing controller 16 to measure the error of the pre-synchronization timing signal S16d. The result is fed back as the offset compensation signal S17 to the clock/timing controller 16.

The operation of the OFDM demodulating apparatus constructed in the above-described manner is described below.

An OFDM signal received via an antenna (not shown) is passed through the bandpass filter 11 extract only component in a necessary frequency band. After noise components outside the necessary frequency band are removed by the bandpass filter 11, the resultant RF signal S11 is converted by the down converter 12 into an IF signal S12.

The IF signal S12 outputted from the down converter 12 is converted into a digital signal S13 by the A/D converter 13 under the control of the clock/timing controller 16, and the resultant digital signal S13 is supplied to the FFT unit 14 and the synchronization position detector 17.

The FFT unit 14 performs a FFT, that is, a first modulation process, on the digital signal S13 outputted from the A/D converter 13.

The timing signal S16b, indicating the start position of the digital signal S13 to be subjected to the FFT performed by the FFT unit 14, is supplied from the clock/timing controller 16. In accordance with the timing signal S16b, the FFT unit 14 performs the FFT.

This timing signal S16b is transmitted in the form of a pulse from the clock/timing controller 16 immediately when the start of an effective symbol period, that is, the first bit (first point) of the digital signal S13 to be subjected to the FFT process is inputted to the FFT unit 14.

In the synchronization position detector 17, the multiplier 172 calculates the complex conjugate product between the digital signal S13 outputted from the A/D converter 13 and the signal delayed by the delay circuit 171 by an amount corresponding to the number of points included in the effective symbol period, and the result is outputted to the moving integration circuit 173.

In the moving integration circuit 173, the total sum of the digital signal in the guard period is calculated for the result of the complex conjugate multiplication. The calculation of the total sum is started from the first point of the signal inputted to the moving integration circuit 173, and the starting point is sequentially shifted by one point. The integration result outputted from the moving integration circuit 173 is supplied to the frame guard removing circuits 174-1 to 174-n.

The frame guard removing circuits 174-1 to 174-n respectively remove a frame guard in the first one of the time slot periods appearing after staring the synchronization process, a frame guard in the second one of the time slot periods, . . ., and a frame guard in the nth one of the time slot periods. The removal of frame guards is performed by removing (neglecting) data in a period equal to the frame guard period, at positions where a frame guard is expected to exist.

In the interval integration circuits 175-1 to 175-n, the digital signals inputted from the corresponding frame guard removing circuits 174-1 to 174-n are divided into segments each having an interval equal to the time slot period, and the respective segments of digital signal are cumulatively added. The resultant cumulative sums are outputted to the threshold peak detector 176.

In the threshold peak detector 176, the results outputted from the interval integration circuits 175-1 to 175-n are monitored, and, when the interval integration result outputted from a certain interval integration circuit is detected to be greater than a threshold, a peak is detected from that interval integration result.

At the time when the peak is detected, the detection signal S176 in the form of a pulse is outputted to the offset compensation signal generator 177.

Thus, the time at which the signal S176 is outputted indicates the timing, detected by the synchronization position detector, of performing the FFT timing. This timing is compared by the offset compensation signal generator 177 with the pre-synchronization signal S16d supplied from the clock/timing controller 16, and the offset compensation signal S17 indicating the error of the pre-synchronization timing with respect to the true synchronization timing is produced and fed back to the clock/timing controller 16.

In the clock/timing controller 16, the synchronization timing is corrected on the basis of the offset compensation signal S17, and the FFT timing signal S16b indicating the correct timing is transmitted to the FFT unit 14.

The result of the FFT operation obtained on the basis of the corrected timing signal S16b is inputted to the demodulator 15 to be subjected to the second demodulation process.

In the present embodiment, as described above, the synchronization position detector 17 is formed so as to include the delay circuit 171 to delay the received OFDM signal by an amount equal to one effective symbol period; the multiplier 172 for determining the correlation between the received OFDM signal and the OFDM signal delayed by the delay circuit; the moving integration circuit 173 for calculating the total sum of the signal outputted from the calculation signal over the entire guard period; the n frame guard removing circuits 174-1 to 174-n, disposed in correspondence with signals in respective first to nth time slot periods, which respectively receive a signal outputted from the moving integration circuit 172, remove the frame guard period from the received signal, and output a resultant signal; the n interval integration circuits 175-1 to 175-n for cumulatively adding the signal outputted from the frame guard removing circuit, for the respective segments each having an interval equal to the time slot period; the detection circuit 176 for detecting a maximum peak from the results of the interval integration supplied from the respective n interval integration circuits and generating a detection signal indicating a synchronization timing position corresponding to the detected maximum peak position, at which the effective symbol period should be extracted; and the offset compensation signal generator 177 for generating an offset compensation signal such that the supplied synchronization timing signal indicating the timing of extracting the effective symbol period is compared with the detection signal outputted from the detection circuit 176 to measure the synchronization timing error, and the offset compensation signal is generated depending upon the measured synchronization timing error, thereby making it possible to achiever more precise synchronization of an OFDM radio communication system using a frame guard.

This synchronization apparatus can also be used to determine a point at which a frame guard to be inserted. This makes it unnecessary to transmit frame synchronization control information (indicating the start position of a frame), and thus it becomes possible to transmit an increased amount of information.

As described above, the present invention provides great advantages. That is, it becomes possible to achieve synchronization in the OFDM radio communication system using frame guards. The interval integration of the correlation value performed in the synchronization apparatus makes it possible to achieve further precise synchronization.

Furthermore, the synchronization apparatus is capable of determining a point at which a frame guard should be inserted. This makes it unnecessary to transmit frame synchronization control information (indicating the start position of a frame), and thus it becomes possible to transmit an increased amount of information.

What is claimed is:

1. A reception synchronization apparatus for detecting a synchronization timing position thereby determining an effective symbol period from an OFDM signal, each frame of which includes a series of n (integer equal to or greater than 1) time slots and a frame guard period added to the series of n time slots, each time slot including an effective symbol period and a guard period added to the effective symbol period, the reception synchronization apparatus comprising:
    a delay circuit for delaying a received OFDM signal by the effective symbol period;
    a calculation circuit for calculating a correlation between the received OFDM signal and an OFDM signal delayed by the delay circuit;
    a frame guard removing circuit that receives a signal outputted from the calculation circuit, removes a frame guard period from a frame period of the received signal, and outputs a resultant signal;
    an interval integrator for cumulatively adding the signal outputted from the frame guard removing circuit, from one time slot period to another; and
    a detection circuit for detecting a maximum peak from the interval integration signal obtained for the intervals of time slot periods and generating a detection signal indicating a synchronization timing position corresponding to the a position of the detected maximum peak, the detection signal being used to extract the effective symbol period with a precise timing corresponding to the position of the maximum peak.

2. The reception synchronization apparatus according to claim 1, further comprising an offset compensation signal generator for generating an offset compensation signal, whereby a supplied synchronization timing signal indicating a timing of extracting the effective symbol period is compared with the detection signal outputted from the detection circuit to measure a synchronization timing error, and the offset compensation signal is generated depending upon the measured synchronization timing error.

3. The reception synchronization apparatus according to claim 1, wherein the detection circuit detects the maximum peak by employing the guard periods as synchronization points.

4. The reception synchronization apparatus according to claim 2, wherein the detection circuit detects the maximum peak by employing the guard periods as synchronization points.

5. The reception synchronization apparatus according to claim 1, wherein the frame guard period is a non-signal period.

6. A reception synchronization apparatus for detecting a synchronization timing position thereby determining an effective symbol period from an OFDM signal, each frame of which includes a series of n (integer equal to or greater than 1) time slots and a frame guard period added to the series of n time slots, each time slot including an effective symbol period and a guard period added to the effective symbol period, the reception synchronization apparatus comprising:
    a delay circuit for delaying a received OFDM signal by the effective symbol period;
    a calculation circuit for calculating a correlation between the received OFDM signal and an OFDM signal delayed by the delay circuit;
    a moving integration circuit for adding the signal outputted from the calculation circuit over an entire guard period;
    a frame guard removing circuit that receives a signal outputted from the moving integration circuit, removes a frame guard period from a frame period of the received signal, and outputs a resultant signal;
    an interval integrator for cumulatively adding the signal outputted from the frame guard removing circuit, from one time slot period to another;
    and a detection circuit for detecting a maximum peak from the interval integration signal obtained for the intervals of time slot periods and generating a detection signal indicating a synchronization timing position corresponding to a position of the detected maximum peak, the detection signal being used to extract the effective symbol period with a timing corresponding to the maximum peak position.

7. The reception synchronization apparatus according to claim 6, further comprising an offset compensation signal generator for generating an offset compensation signal, whereby a supplied synchronization timing signal indicating a timing of extracting the effective symbol period is compared with the detection signal outputted from the detection circuit to measure a synchronization timing error, and the offset compensation signal is generated depending upon the measured synchronization timing error.

8. The reception synchronization apparatus according to claim 6, wherein the detection circuit detects the maximum peak by employing the guard periods as synchronization points.

9. The reception synchronization apparatus according to claim 7, wherein the detection circuit detects the maximum peak by employing the guard periods as synchronization points.

10. The reception synchronization apparatus according to claim 6, wherein the frame guard period is a non-signal period.

11. A reception synchronization apparatus for detecting a synchronization timing position thereby determining an effective symbol period from an OFDM signal, each frame of which includes a series of n (integer equal to or greater than 1) time slots and a frame guard period added to the series of n time slots, each time slot including an effective symbol period and a guard period added to the effective symbol period, the reception synchronization apparatus comprising:
- a delay circuit for delaying a received OFDM signal by the effective symbol period;
- a calculation circuit for calculating a correlation between the received OFDM signal and an OFDM signal delayed by the delay circuit;
- n frame guard removing circuits, disposed in correspondence with signals in respective first to nth time slot periods, which receive a signal outputted from the calculation circuit, remove the frame guard period from the received signal, and output a resultant signal;
- n interval integration circuits, disposed in correspondence with the respective n frame guard removing circuits, which cumulatively add the signals outputted from corresponding frame guard removing circuits from one time slot to another; and
- a detection circuit for detecting a maximum peak from the interval integration signals supplied from the respective n interval integration circuits and generating a detection signal indicating a synchronization timing position corresponding to a position of the detected maximum peak, the detection signal being used to extract the effective symbol period with a timing corresponding to the maximum peak position.

12. The reception synchronization apparatus according to claim 11, further comprising an offset compensation signal generator for generating an offset compensation signal, whereby a supplied synchronization timing signal indicating a timing of extracting the effective symbol period is compared with the detection signal outputted from the detection circuit to measure a synchronization timing error, and the offset compensation signal is generated depending upon the measured synchronization timing error.

13. The reception synchronization apparatus according to claim 11, wherein the detection circuit detects the maximum peak by employing the guard periods as synchronization points.

14. The reception synchronization apparatus according to claim 12, wherein the detection circuit detects the maximum peak by employing the guard periods as synchronization points.

15. The reception synchronization apparatus according to claim 11, wherein the frame guard period is a non-signal period.

16. A reception synchronization apparatus for detecting a synchronization timing position thereby determining an effective symbol period from an OFDM signal, each frame of which includes a series of n (integer equal to or greater than 1) time slots and a frame guard period added to the series of n time slots, each time slot including an effective symbol period and a guard period added to the effective symbol period, the reception synchronization apparatus comprising:
- a delay circuit for delaying a received OFDM signal by the effective symbol period;
- a calculation circuit for calculating the correlation between the received OFDM signal and an OFDM signal delayed by the delay circuit;
- a moving integration circuit for adding the signal outputted from the calculation signal over an entire guard period;
- n frame guard removing circuits, disposed in correspondence with signals in respective first to nth time slot periods, which respectively receive a signal outputted from the moving integration circuit, remove the frame guard period from the received signal, and output a resultant signal;
- n interval integration circuits, disposed in correspondence with the respective n frame guard removing circuits, which cumulatively add the signals outputted from corresponding frame guard removing circuits from one time slot to another; and
- a detection circuit for detecting a maximum peak from the interval integration signals supplied from the respective n interval integration circuits and generating a detection signal indicating a synchronization timing position corresponding to a position of the detected maximum peak, the detection signal being used to extract the effective symbol period with a precise timing corresponding to the maximum peak position.

17. The reception synchronization apparatus according to claim 16, further comprising an offset compensation signal generator for generating an offset compensation signal, whereby a supplied synchronization timing signal indicating a timing of extracting the effective symbol period is compared with the detection signal outputted from the detection circuit to measure a synchronization timing error, and the offset compensation signal is generated depending upon the measured synchronization timing error.

18. The reception synchronization apparatus according to claim 16, wherein the detection circuit detects the maximum peak by employing the guard periods as synchronization points.

19. The reception synchronization apparatus according to claim 17, wherein the detection circuit detects the maximum peak by employing the guard periods as synchronization points.

20. The reception synchronization apparatus according to claim 16, wherein the frame guard period is a non-signal period.

21. A demodulating apparatus for extracting effective symbol periods from an OFDM signal in synchronization with a synchronization timing signal and demodulating signals in the extracted effective symbol periods, each frame of the OFDM signal including a series of n (integer equal to or greater than 1) time slots and a frame guard period added to the series of n time slots, each time slot including an effective symbol period and a guard period added to the effective symbol period, the demodulating apparatus comprising:
- a timing controller for generating the synchronization timing signal and correcting a synchronization timing based on a supplied offset compensation signal; and
- a reception synchronization apparatus including:
- a delay circuit for delaying a received OFDM signal by an effective symbol period;
- a calculation circuit for calculating a correlation between the received OFDM signal and an OFDM signal delayed by the delay circuit;
- a frame guard removing circuit that receives a signal outputted from the calculation circuit, removes a frame guard period from a frame period of the received signal, and outputs a resultant signal;
- an interval integrator for cumulatively adding the resultant signal outputted from the frame guard removing circuit, from one time slot period to another;
- a detection circuit for detecting a maximum peak from the interval integration signal obtained for the intervals of time slot periods and generating a detection signal indicating a synchronization timing position corresponding to a position of the detected maximum peak, the detection signal being used to extract the effective symbol period with a timing corresponding to the maximum peak position; and an offset compensation signal generator for generating the offset compensation signal to be supplied to the timing controller such that the synchronization timing signal is compared with the detection signal outputted from the detection circuit to measure a synchronization timing error and the measured result is supplied as the offset compensation signal to the timing controller.

22. The demodulating apparatus according to claim 21, wherein the detection circuit of the reception synchronization apparatus detects the maximum peak by employing the guard periods as synchronization points.

23. The demodulating apparatus for extracting effective symbol periods from an OFDM signal in synchronization with a synchronization timing signal and demodulating signals in the extracted effective symbol periods, each frame of the OFDM signal including a series of n (integer equal to or greater than 1) time slots and a frame guard period added to the series of n time slots, each time slot including an effective symbol period and a guard period added to the effective symbol period, the demodulating apparatus comprising:

a timing controller for generating the synchronization timing signal and correcting the synchronization timing based on a supplied offset compensation signal; and a reception synchronization apparatus including:

a delay circuit for delaying a received OFDM signal by an effective symbol period;

a calculation circuit for calculating a correlation between the received OFDM signal and an OFDM signal delayed by the delay circuit;

a moving integration circuit for adding the signal outputted from the calculation signal over an entire guard period;

a frame guard removing circuit that receives a signal outputted from the moving integration circuit, removes a frame guard period from a frame period of the received signal, and outputs a resultant signal;

an interval integrator for cumulatively adding the resultant signal outputted from the frame guard removing circuit, from one time slot period to another;

a detection circuit for detecting a maximum peak from the interval integration signal obtained for the intervals of time slot periods and generating a detection signal indicating a synchronization timing position corresponding to a position of the detected maximum peak, the detection signal being used to extract the effective symbol period with a timing corresponding to the maximum peak position; and an offset compensation signal generator for generating the offset compensation signal to be supplied to the timing controller such that the synchronization timing signal is compared with the detection signal outputted from the detection circuit to measure a synchronization timing error and the measured result is supplied as the offset compensation signal to the timing controller.

24. The demodulating apparatus according to claim 23, wherein the detection circuit of the reception synchronization apparatus detects the maximum peak by employing the guard periods as synchronization points.

25. A demodulating apparatus for extracting effective symbol periods from an OFDM signal in synchronization with a synchronization timing signal and demodulating signals in the extracted effective symbol periods, each frame of the OFDM signal including a series of n (integer equal to or greater than 1) time slots and a frame guard period added to the series of n time slots, each time slot including an effective symbol period and a guard period added to the effective symbol period, the demodulating apparatus comprising:

a timing controller for generating the synchronization timing signal and correcting synchronization timing based on a supplied offset compensation signal; and a reception synchronization apparatus including:

a delay circuit for delaying a received OFDM signal by an effective symbol period;

a calculation circuit for calculating a correlation between the received OFDM signal and an OFDM signal delayed by the delay circuit;

n frame guard removing circuits, disposed in correspondence with signals in respective first to nth time slot periods, which receive a signal outputted from the calculation circuit, remove the frame guard period from the received signal, and output a resultant signal;

n interval integration circuits, disposed in correspondence with the respective n frame guard removing circuits, which cumulatively add the signals outputted from corresponding frame guard removing circuits from one time slot period to another;

a detection circuit for detecting a maximum peak from the interval integration signals supplied from the respective n interval integration circuits and generating a detection signal indicating a synchronization timing position corresponding to a position of the detected maximum peak, the detection signal being used to extract the effective symbol period with a timing corresponding to the maximum peak position; and an offset compensation signal generator for generating the offset compensation signal to be supplied to the timing controller such that the synchronization timing signal is compared with the detection signal outputted from the detection circuit to measure a synchronization timing error and the measured result is supplied as the offset compensation signal to the timing controller.

26. The demodulating apparatus according to claim 25, wherein the detection circuit of the reception synchronization apparatus detects the maximum peak by employing the guard periods as synchronization points.

27. A demodulating apparatus for extracting effective symbol periods from an OFDM signal in synchronization with a synchronization timing signal and demodulating signals in the extracted effective symbol periods, each frame of the OFDM signal including a series of n (integer equal to or greater than 1) time slots and a frame guard period added to the series of n time slots, each time slot including an effective symbol period and a guard period added to the effective symbol period, the demodulating apparatus comprising:

a timing controller for generating the synchronization timing signal and correcting synchronization timing on the basis of a supplied offset compensation signal; and a reception synchronization apparatus including:

a delay circuit for delaying a received OFDM signal by an effective symbol period;

a calculation circuit for calculating a correlation between the received OFDM signal and an OFDM signal delayed by the delay circuit;

a moving integration circuit for adding the signal outputted from the calculation signal over an entire guard period;

n frame guard removing circuits, disposed in correspondence with signals in respective first to nth time slot periods, which respectively receive a signal outputted from the moving integration circuit, remove the frame guard period from the received signal, and output a resultant signal;

n interval integration circuits, disposed in correspondence with the respective n frame guard removing circuits, which cumulatively add the signals outputted from corresponding frame guard removing circuits from one time slot period to another;

a detection circuit for detecting a maximum peak from the interval integration signals supplied from the respective n interval integration circuits and generating a detection signal indicating a synchronization timing position corresponding to a position of the detected maximum peak, the detection signal being used to extract the effective symbol period with a timing corresponding to the maximum peak position; and an offset compensation signal generator for generating the offset compensation signal to be supplied to the timing controller such that the synchronization timing signal is compared with the detection signal outputted from the detection circuit to measure a synchronization timing error and the measured result is supplied as the offset compensation signal to the timing controller.

28. The demodulating apparatus according to claim 27, wherein the detection circuit of the reception synchronization apparatus detects the maximum peak by employing the guard periods as synchronization points.

* * * * *